Nov. 21, 1939.  G. FLEISCHEL  2,180,671

PLANETARY TRANSMISSION SYSTEM

Filed Jan. 31, 1939

Inventor:
Gaston Fleischel,

Bailey & Carson
Attorneys

Patented Nov. 21, 1939

2,180,671

UNITED STATES PATENT OFFICE 2,180,671

PLANETARY TRANSMISSION SYSTEM

Gaston Fleischel, Bleneau, Yonne, France

Application January 31, 1939, Serial No. 253,907
In France February 5, 1938

11 Claims. (Cl. 74—268)

The present invention relates to planetary transmission systems adapted to give several gear ratios, of the kind of those described in my copending application Ser. No. 62,383, filed February 4, 1936.

In this prior application, I explained how it is possible to obtain a plurality of different gear ratios by means of combinations of any number of planetary trains, these combinations consisting essentially in connecting any group or member of a train to any member of the next train. Then, among the members which remain free, one is chosen for the drive by the engine, another, preferably chosen in the same train (which is called, for this reason, main train, whereas the other trains are called coupling trains) serves to drive the part to be actuated; finally, the other members which remain free are each provided with a clutch permitting of driving them at any speed of desired value and with a brake which can stop them when necessary.

With a system of this kind, the three following characteristics are always obtained, which result from the above stated characteristics, whatever be the number of trains in the combination:

A member of the coupling train, or of the whole of said coupling trains, if several coupling trains are provided, is connected with the third member of the main train, the one which is neither the driving member nor the driven member;

Another member of the same whole is connected through clutch means with the driving shaft.

Finally, a third member is also connected through clutch means with the driven shaft.

The object of the present invention is to provide a combined planetary transmission system of the type above described which has at least one gear ratio in addition to these obtained with the prior system, without involving the presence of any supplementary gear, and also a dead center or neutral gear which permits of running the engine while the vehicle is stationary.

The essential feature of the present invention consists in arranging the first member of the coupling train or trains, that is to say the member which, in combinations of the type above described, is connected to the third member of the main train, in such manner that it can be uncoupled therefrom and stopped in fixed position in any suitable manner.

In addition to this main feature, which permits of obtaining at least one supplementary gear ratio, the present invention is further characterized by the fact that the first member of the coupling train or trains can be kept separated from the third member of the main train without undergoing any new connection, in which case I obtain a dead center or neutral gear arrangement.

Other features of the present invention will result from the following detailed description of some specific embodiments thereof.

Preferred embodiments of the present invention will be hereinafter described, with reference to the accompanying drawing, given merely by way of example, and in which.

Figure 1:
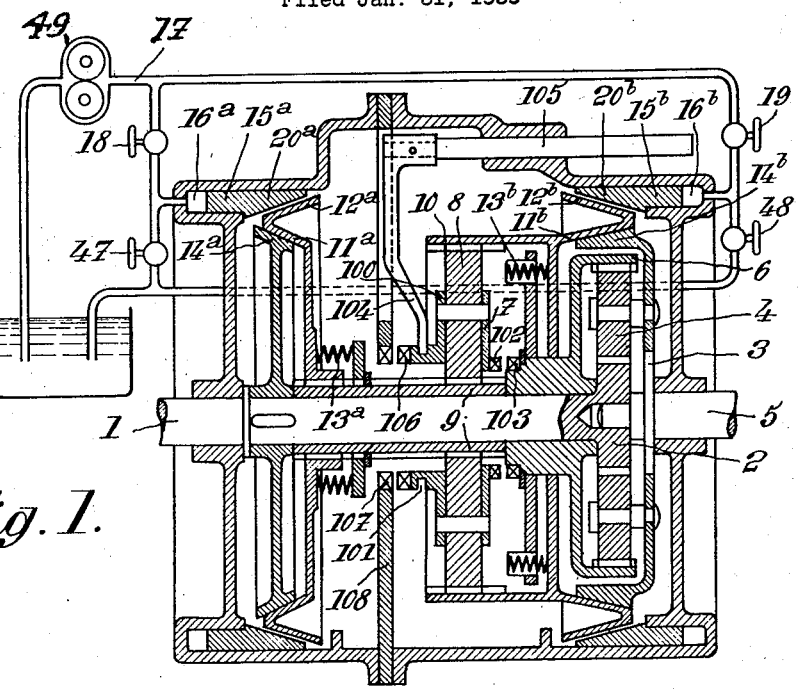
Fig. 1 is a longitudinal sectional view of a transmission system giving five different gear ratios, by means of the combination of two trains, said transmission system being made according to the present invention.

In Fig. 1, I have shown the same mechanism as that described in the first figure of the above mentioned copending prior application, this mechanism being modified according to the principle of the present invention.

The main train includes the driving shaft 1 and the central pinion 2 (driving member), the driven shaft 5 rigid with disc 3 (driven member), bearing, through a plurality of pins or spindles, planet wheels 4, and, finally, as third member, wheel 6 which is free to rotate on shaft 1.

The coupling train includes a planet-wheel carrying plate or disc 7, with suitable pins or spindles carying a series of planet wheels 8, a central pinion 9, preferably of elongated shape, the teeth of which extend, for instance, over the whole length thereof, said pinion 9 being adapted to turn freely on the driving shaft 1, and an external wheel 10, adapted to turn freely about the hub of wheel 6, for instance.

The central pinion 9 and the external wheel 10 constitute, respectively, the coupling members of the coupling train, and, as such, they must be provided with clutch means and braking means, for instance as follows:

Each of these members is provided with a suitable friction surface, for instance a double cone 11a—12a for member 9, this cone being carried by a disc the sliding hub of which is adapted to move along the teeth of pinion 9, whereby said disc can move axially with respect to pinion 9 while remaining in driving mesh therewith.

For member 10, cones 11a and 12b are fixed for instance directly to wheel 10, the whole being adapted to slide axially along the teeth of the planet-wheels.

Springs 13a for cone 11a and 13b for cone 11b apply these cones respectively against the cones 14a carried by the driving shaft 1, and 14b carried by shaft 5. In this way, the engagement conditions of coupling members 9 and 10 are normally ensured by engagement of pinion 9 with shaft 1 and of wheel 10 with shaft 5.

In order to produce the braking conditions which must be substituted for the clutch engagement conditions, I provide, for obtaining the various gear ratios, circular chambers 16a and 16b, for instance provided in the outer casing of the system, with circular rings 15a and 15b engaged in said chambers and acting as pistons.

It is possible to send a fluid, a liquid or a gas under pressure, for instance oil, into the annular space thus provided, for instance owing to a suitable conduit 17, connected to a compressor 49 and provided with fluid distributing means such as 18 and 19.

The portion of rings 15a and 15b opposed to the face that receives the oil pressure is given the shape of a cone, as shown at 20a and 20b. In this way, if oil under pressure is forced into these chambers, these cones carried by the pistons, when moving axially, can come into contact with cones 12a and 12b. By pushing back these cones, against the action of their respective springs, they prevent them from stopping, and, at the same time, they separate cones 11a and 14a, 11b and 14b, which, prior to this, were in contact. In this way, I substitute, for parts 9 and 10, braking conditions to clutch engagement conditions as occurred precedingly. Of course, the control of brake 20a is independent of that of brake 20b.

According to the invention, planet-wheel carrier 7, with its planet-wheels and their spindles, is made axially slidable. It is provided with clutch teeth 102 capable of cooperating with corresponding teeth 103 provided on the hub of wheel 6. On the other side of the planet-wheels 8 I provide another plate or disc 100 provided with a groove 101 in which can be engaged an operating fork 104 carried by a sliding rod 105, and clutch teeth 106 capable of cooperating with corresponding teeth 107 carried by a fixed plate or disc 108 connected to the frame of the mechanism.

Wheel 10 and pinion 9 have a sufficient length of free teeth for permitting planet-wheel carrier 7 to move axially without ceasing to be in mesh with these parts.

This system will work in the following manner:

When fork 104 is moved toward the right hand side of Fig. 1, in such manner as to bring teeth 102 into engagement with teeth 103, which couples the planet-wheel carrier 7 with wheel 6, it is possible to obtain four different gear ratios by the action of the oil distribution.

*Fifth gear.*—Owing to outlet valves 47 and 48, oil is allowed to escape from chambers 16a and 16b. Through the action of springs 13a and 13b, cones 11a and 11b are respectively applied against cones 14a and 14b, as shown by the drawing. The coupling train therefore acts as a rigid block and it drives wheel 6 at the speed of the engine. Two members of the main train have the same speed (that of the engine) so that this last mentioned train also moves as a rigid block and I obtain a gear ratio corresponding to 1, that is to say the direct drive.

*Fourth speed.*—Oil is sent under pressure into chamber 16a, while keeping chamber 16b empty. Then the coupling train has its wheel 10 driven at the same speed as the driven shaft, through cones 11b and 14b, whereas its central pinion 9 is immobilized by cones 12a and 20a brought in contact with each other and held in this position by the oil under pressure of chamber 16a. The planet-wheels can then turn and they impart to their carrier 7, and therefore to the wheel 6 of the main train a speed lower than the driving speed. It follows that, through the action of the planet-wheels 4 of the main train, shaft 5 is driven more slowly than precedingly.

*Third speed ratio.*—Oil is evacuated from chamber 16a, and, on the contrary, oil under pressure is fed to chamber 16b. In this way, the wheel 10 of the coupling train is stopped in fixed position, whereas the central pinion 9 of the same train turns at the same speed as the driving shaft. Owing to the considerable difference of diameter between pinion 9 and wheel 10, and despite the fact that the central pinion 9 is connected with the driving shaft, the angular velocity of the planet-wheel carrier 7 of the coupling train, and therefore that of the wheel 6 of the main train, is still lower than in the preceding case.

Therefore, through the action of the planet-wheels 4 of the main train, shaft 5 is itself driven at a still lower speed.

*Second gear ratio.*—Oil under pressure is fed both to chamber 16a and to chamber 16b. By the application of cones 20a on 12a and 20b on 12b, the wheel 10 and the central pinion 9 of the coupling train are kept in fixed position. This causes the planet-wheel carrier 7 to stop because planet wheels 8 cannot turn, so that the wheel 6 of the main train is also stopped. The main train therefore works with the last member thereof wholly immobilized, and the gear ratio on shaft 5 is still lower than in the preceding case.

*Neutral gear.*—In order to obtain neutral gear arrangement, whatever be the gear ratio that is employed, it suffices to move fork 104 in such manner as to move teeth 102 and 103 out of engagement. As each planetary train has a member which is free, it can turn idly, that is to say without transmitting any power, whatever be the other connections. In this way, the engine can keep rotating while the vehicle is stationary.

*First gear ratio.*—By means of fork 104, teeth 106 are brought into engagement with teeth 107. At the same time, oil under pressure is allowed to escape from chambers 16a and 16b, in such manner as to engage clutch elements 11a, 14a and 11b, 14b. Under these conditions, the main train is neutralized, since its member 6 remains without connection, and this train can turn freely, as for neutral gear. The driving power is collected through clutch 11a—14a, which transmits it to the central pinion 9. As the planet-wheel carrier 7 is immobilized by teeth 106—107, the planet-wheel means act as reversing gear and wheel 10 is given a movement in the reversed direction and at a reduced speed, owing to the difference of the teeth of pinion 9 with respect to wheel 10. This movement is transmitted through cones 11b and 14b to the driven shaft 5. Therefore, it will be clear that, in the present example, the first gear combination is a reversed gear.

A different result might be obtained with another ratio or another arrangement of the coupling train. But in all cases, this first gear is different from the four others because it is the only one to make use of the coupling gear uncoupled, in the same manner as explained for the main train in another combination, that is to say with a member stopped.

Therefore, I obtain five different gear ratios with two simple planetary trains, that is to say with eight wheels when there are two planet wheels for each train and with ten wheels as a whole if each train includes three planet-wheels.

This result is obtained by modifying only one connection of a single member of the coupling train, that is to say the connection with the main train.

Figure 2:
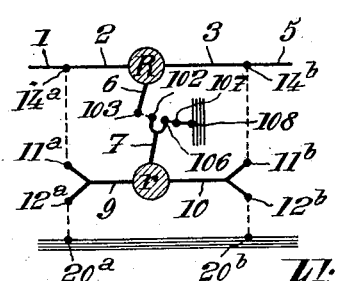
Fig. 2 is a conventional diagrammatic view of the same mechanism.

Fig. 2 is a conventional illustration of the mechanism of Fig. 1, which permits of eliminating all constructional details so as to show only the principle of the invention.

Each train is shown by a mere circle inside which is inscribed the reference character designating the train in question. Circle R therefore shows the main train, the three members 2, 3 and 6 of which are shown by three arms, respectively. It will be seen that member 2, which is the central pinion, is fixed to the driving shaft 1 and that member 3 is fixed to the driven shaft 5. Arm 6 is shown as fitted with clutch teeth 103.

The coupling train is shown in a similar manner at r, with arms 7, 9 and 10 showing the three members thereof.

Arm 7 carries the clutch teeth 102 and 106 and it is supposed to be pivoted at its lower end so as to be able to couple these teeth 102 to the teeth 103 of the member 6 of the main train or these clutch teeth 107 with the clutch teeth 107 of a fixed part shown at 108.

Likewise, arms 9 and 10 carry each one fork one branch 11a or 11b of which represents the friction surfaces of clutches capable of being connected with the surfaces 14a of the driving shaft or 14b of the driven shaft. The other branches 12a and 12b of these forks are capable of being braked by the surfaces 20a and 20b, the fixed position of which is conventionally shown by the superposition of several lines. All the characteristics of the invention are thus illustrated without any useless detail.

Figure 3:
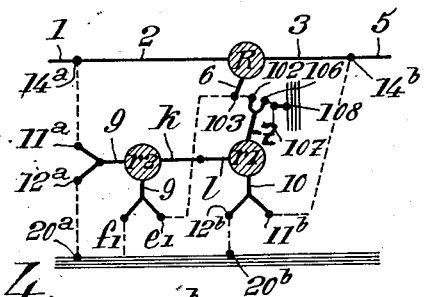
Fig. 3 is a conventional diagrammatic view of a system according to the present invention, capable of giving ten different gear ratios, by means of the combination of three planetary gears.

Fig. 3 shows, according to this conventional way of showing, the application of the invention to a combination of three trains, to wit: a main train R and two coupling trains $r_1$ and $r_2$. These two trains are permanently connected together by the member 1 of train $r_1$ connected to the member $k$ of train $r_2$. The member 7 of train $r_1$ carries clutch teeth 102 and 106 capable of cooperating with the clutch teeth 103 of the member 6 of train R and 107 of the fixed piece 108. The member 9 of train $r_2$ carries the clutch surface 11a capable of cooperating with the clutch surface 14a of shaft 1. And the braking surface 12a capable of cooperating with the fixed brake cone 20a is also carried by said member 9. The member 10 of train $r_1$ carries the clutch surface 11b which cooperates with surface 14b of the driven shaft and the brake surface 12b which cooperates with fixed surface 20b. The member $g$ of train $r_2$ which is left free is provided with a clutch $e_1$ analogous to 11a—14a, which permits of coupling it for instance with the member 6 of train R and with a brake $f_1$ analogous to 12a—20a, which permits of fixing it in position.

This combination permits of obtaining ten different gear ratios. First the clutch teeth 102 are engaged with teeth 103. I then obtain with different gears by bringing into play the various frictions of the members through the mere action of the distribution of oil under pressure.

*Tenth gear ratio.*—Clutch 11a—14a, clutch 11b—14b, clutch $e_1$;
*Ninth gear ratio.*—Brake 12a—20a, clutch 11b—14b, clutch $e_1$;
*Eighth gear ratio.*—Clutch 11a—14a, brake 12b—20b, clutch $e_1$;
*Seventh gear ratio.*—Brake 12a—20a, brake 12b—20b, clutch $e_1$;
*Sixth gear ratio.*—Clutch 11a—14a, clutch 11b—14b, brake $f_1$;
*Fifth gear ratio.*—Brake 12a—20a, clutch 11b—14b, brake $f_1$;
*Fourth gear ratio.*—Clutch 11a—14a, brake 12b—20b, brake $f_1$;
*Third gear ratio.*—Brake 12a—20a, brake 12b—20b, brake $f_1$.

Then, by engaging the clutch teeth 106 with 108 and by simultaneously applying clutches 11a—14a and 11b—14b, I obtain two further gear ratios, to wit:

*Second gear ratio.*—Clutch $e_1$.
*First gear ratio.*—Brake $f_1$.

These two ratios, which may correspond to forward or reverse drive, are different from the others because they utilize separately the combination of the two trains $r_1$ and $r_2$ connected in series, in one case with clutch $e_1$ applied and in the other case with brake $f_1$ applied. This corresponds to two different working conditions for member $g$, and therefore for the gear ratios given by the whole.

In order to obtain neutral gear, arm 7 is left without connection, that is to say with all its clutch teeth disengaged. The main train and the whole of the coupling trains become free to move, since they have each one member which is not coupled to any part.

Therefore, I obtain ten different gear ratios with three planetary trains, that is to say twelve or fifteen wheels according as each train includes two or three planet wheels.

Figure 4:
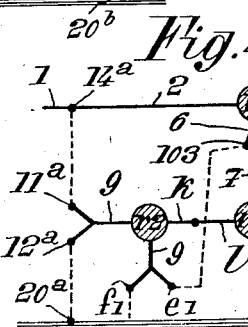
Fig. 4 is a conventional diagrammatic view of a system according to the present invention, capable of giving twenty different gear ratios, by combination of four planetary gears.

Fig. 4 is a conventional illustration of the combination of four planetary trains which permit of obtaining twenty different gear ratios.

The main train R remains unchanged as compared with the main train of one of the preceding embodiments. There are three coupling trains, to wit $r_1$, $r_2$, $r_3$. They are connected in the following manner: members $l$ and $m$ of train $r_1$ are connected respectively to member $k$ of train $r_2$ and member $n$ of train $r_3$. Members 9 and 10 of trains $r_2$ and $r_3$ respectively receive the clutches 11a—14a leading to the driving shaft 1 and 11b—14b leading to the driven shaft 5, and the brakes 12a—20a and 12b—20b which permit of immobilizing them. The member 7 of train $r_1$ carries clutch teeth 102 and 106 capable of cooperating with the teeth 103 of the member 6 of the main train R and the member 7 of fixed part 108.

The twenty gear ratios above mentioned are obtained as follows:

*Twentieth gear.*—Clutch 11a—14a, clutch 11b—14b, clutch $e_1$, clutch $e_2$;

Nineteenth gear.—Brake $12a$—$20a$, clutch $11b$—$14b$, clutch $e_1$, clutch $e_2$;
Eighteenth gear.—Clutch $11a$—$14a$, brake $11b$—$20b$, clutch $e_1$, clutch $e_2$;
Seventeenth gear.—Brake $12a$—$12a$, brake $12b$—$20b$, clutch $e_1$, clutch $e_2$;
Sixteenth gear.—Clutch $11a$—$14a$, clutch $11b$—$14b$, brake $f_1$, clutch $e_2$;
Fifteenth gear.—Brake $12a$—$20a$, clutch $11b$—$14b$, brake $f_1$, clutch $e_2$;
Fourteenth gear.—Clutch $11a$—$14a$, brake $12b$—$20b$, brake $f_1$, clutch $e_2$;
Thirteenth gear.—Brake $12a$—$20a$, brake $12b$—$20b$, brake $f_1$, clutch $e_2$;
Twelfth gear.—Clutch $11a$—$14a$, clutch $11b$—$14b$, clutch $e_1$, brake $f_2$;
Eleventh gear.—Brake $12a$—$20a$, clutch $11b$—$14b$, clutch $e_1$, brake $f_2$;
Tenth gear.—Clutch $11a$—$14a$, brake $12b$—$20b$, clutch $e_1$, brake $f_2$;
Ninth gear.—Brake $12a$—$20a$, brake $12b$—$20b$, clutch $e_1$, brake $f_2$;
Eighth gear.—Clutch $11a$—$14a$, clutch $11b$—$14b$, brake $f_1$, brake $f_{2p}$;
Seventh gear.—Brake $12a$—$20a$, clutch $11b$—$14b$, brake $f_1$, brake $f_2$;
Sixth gear.—Clutch $11a$—$14a$, brake $12b$—$20b$, brake $f_1$, brake $f_2$;
Fifth gear.—Brake $12a$—$20a$, brake $12b$—$20b$, brake $f_1$, brake $f_2$;

The four other gear ratios are obtained by engaging first teeth 106 with teeth 108, and by applying simultaneously clutches $11a$—$14a$ and $11b$—$14b$. In this way, I obtain:
Fourth gear.—Clutch $e_1$, clutch $e_2$;
Third gear.—Brake $f_1$, clutch $e_2$;
Second gear.—Clutch $e_1$, brake $f_2$;
First gear.—Brake $f_1$, brake $f_2$.

These four new ratios are different from the others since they are obtained by separately employing the group of the coupling trains in which each of the members $g$ and $h$ is given two different positions of work which, by combination of braking and clutch engagement, give four new gear ratios.

Neutral gear is obtained as in the preceding examples, by disengaging clutch teeth 102 and 106 from the respective teeth 103 and 107.

In a wholly general manner, if the planetary trains are of a number equal to $n$, I obtain $2^n$ combinations by engagement of teeth 102 with teeth 103 and the play of the oil distribution means.

Then, by engagement of teeth 106 with teeth 107, I further obtain $2^{n-2}$ other gear ratios. As a matter of fact, the number of the gear ratios that are obtained is equal to five at a power equal to the number of trains employed less two.

For instance, the twenty gear ratios above indicated are obtained with four gear trains, that is to say sixteen or twenty wheels according as each planetary wheel includes two or three planet-wheels.

Whatever be the number of trains that is utilized, it is obvious that the invention is always applicable, since it concerns only the connecting members 6 and 7 of the main train R with the first coupling train $r_1$, and the friction couplings mounted on the members 9 and 10 of the coupling trains.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A planetary gearing system for connecting two shafts, which comprises, in combination, a main planetary train and at least one coupling planetary train, each of these trains comprising three elements, means for permanently connecting two elements of said main train to said shafts, respectively, the elements of said coupling train being rotatable with respect to said shafts, means for detachably connecting one element of said coupling train with the third element of said main train or for immobilizing said element of the coupling train, and means for controlling the two other elements of said coupling train.

2. A planetary gearing system for connecting two shafts, which comprises, in combination, a main planetary train and at least one coupling planetary train, each of these trains including three elements, means for permanently connecting two elements of said main train to said shafts, respectively, the elements of said coupling train being rotatable with respect to said shafts, means for detachably connecting one element of said coupling train with the third element of said main train or for leaving said element of the coupling train wholly unconnected, and means for controlling the two other elements of said coupling train.

3. A planetary gearing system for connecting two shafts, which comprises, in combination, a main planetary train and at least one coupling planetary train, each of these trains including three elements, means for permanently connecting two elements of said main train to said shafts, respectively, the elements of said coupling train being rotatable with respect to said shafts, means for detachably connecting one element of said coupling train with the third element of said main train, or for leaving said element of the coupling train unconnected, or again for immobilizing said element of the coupling train, and means for controlling the two other elements of said coupling train.

4. A planetary gearing system for connecting two shafts, which comprises, in combination, a main planetary train and at least one coupling planetary train, each of these trains comprising three elements, means for permanently connecting two elements of said main train to said shafts, respectively, the elements of said coupling train being rotatable with respect to said shafts, means for detachably connecting one element of said coupling train with the third element of said main train or for immobilizing said element of the coupling train, and means for controlling the other two elements of said coupling train, including means for selectively connecting one of said two last mentioned elements of the coupling train with one of said shafts or for braking it.

5. A planetary gearing system for connecting two shafts, which comprises, in combination, a main planetary train and at least one coupling planetary train, each of these trains comprising three elements, means for permanently connecting two elements of said main train to said shafts, respectively, the elements of said coupling train being rotatable with respect to said shafts, means for detachably connecting one element of said coupling train with the third element of said main train, or for leaving said element of the coupling train unconnected, or again for immobilizing said element of the coupling train, and means for coupling the other two elements of said coupling train, including means for selectively connecting one of said two last mentioned elements of the coupling train with one of said shafts or for braking it.

6. A planetary gearing system for connecting two shafts, which comprises, in combination, a main planetary train and at least one coupling planetary train, each of these trains comprising three elements, means for permanently connecting two elements of said main train to said shafts, respectively, the elements of said coupling train being rotatable with respect to said shafts, means for detachably connecting one element of said coupling train with the third element of said main train or for immobilizing said element of the coupling train, and means for controlling the other two elements of said coupling train, including means for selectively connecting said two last mentioned elements of the coupling train to said shafts, respectively, or for braking them.

7. A planetary gearing system for connecting two shafts, which comprises, in combination, a main planetary train and at least one coupling planetary train, each of these trains comprising three elements, means for permanently connecting two elements of said main train to said shafts, respectively, the elements of said coupling train being rotatable with respect to said shafts, means for detachably connecting one element of said coupling train with the third element of said main train, or for leaving said element of the coupling train unconnected, or again for immobilizing said element of the coupling train, and means for controlling the other two elements of said coupling train, including means for selectively connecting said two last mentioned elements of said coupling train to said shafts, respectively, or for braking them.

8. A planetary system for connecting two shafts, which comprises, in combination, a main planetary train and at least one coupling planetary train, each of these trains including three elements, means for permanently connecting two elements of said main train to said two shafts, respectively, the elements of said coupling train being rotatable with respect to said shafts, clutch means for connecting at will one element of said coupling train with the third element of said main train, a fixed part, means for detachably fixing said element of said coupling train with said fixed part, means for keeping said element of said coupling train unconnected, clutch means for connecting one of the two other elements of said coupling train with one of said shafts, means for braking said last mentioned element of said coupling train with respect to said fixed part, clutch means for connecting the third element of said coupling train with the other of said shafts, and means for braking said last mentioned element of said coupling train with respect to said fixed part.

9. A planetary gearing system for connecting two shafts, which comprises, in combination, a main planetary train and at least one coupling planetary train, each of these trains including three elements, means for permanently connecting two elements of said main train to said two shafts, respectively, the elements of said coupling train being rotatable with respect to said shafts, positive clutch means for connecting at will one element of said coupling train with the third element of said main train, a fixed part, means for positively connecting said element of said coupling train with said fixed part, so as to immobilize said element of said coupling train, means for keeping said element of said coupling train unconnected, clutch means for connecting one of the two other elements of said coupling train with one of said shafts, spring means for urging said clutch means toward active position, means for braking said last mentioned element of said coupling train with respect to said fixed part while disengaging said clutch means, fluid operated means for controlling said braking means, clutch means for connecting the third of the elements of said coupling train with the other shaft, spring means for urging said last mentioned clutch means toward active position, means for braking said last mentioned element of said coupling train with respect to said fixed part while disengaging said last mentioned clutch means, and fluid operated means for controlling said last mentioned braking means.

10. A planetary gearing system for connecting two shafts, which comprises, in combination, a main planetary train and two coupling trains, each of these trains including three elements, means for permanently connecting two elements of said main train to said two shafts, respectively, the elements of said coupling trains being rotatable with respect to said shafts, clutch means for connecting at will one element of one of said coupling trains with the third element of said main train, a fixed part, means for positively connecting said element of said coupling train with said fixed part, so as to immobilize said element of said coupling train, means for keeping said element of said coupling train unconnected, clutch means for connecting one of the two other elements of said coupling train with one of said shafts, means for braking said last mentioned element of said coupling train with respect to said fixed part while disengaging said clutch means, means for directly connecting the third element of said coupling train with one of the elements of the second coupling train, clutch means for connecting the second element of said second coupling train with said third element of said main train, means for braking said second element of said second coupling train with respect to said fixed part, means for detachably connecting the third element of said second coupling train with the other shaft, and means for braking said third element of said second coupling train with respect to said fixed part.

11. A planetary gearing system for connecting two shafts, which comprises, in combination, a main planetary train and three coupling trains, each of these trains including three elements, means for permanently connecting two elements of said main train to said two shafts, respectively, the elements of said coupling trains being rotatable with respect to said shafts, clutch means for connecting at will one element of one of said coupling trains with the third element of said main train, a fixed part, means for positively connecting said element of said coupling train with said fixed part, so as to immobilize said element of said coupling train, means for keeping said element of said coupling train unconnected, clutch means for connecting one element of each of the two other coupling trains with one of said shafts, respectively means for braking said two last mentioned elements with respect to said fixed part while disengaging the corresponding last mentioned clutch means, clutch means for connecting another element of each of the two last mentioned coupling trains with the third element of said main train, means for braking said two last mentioned elements of said two last mentioned coupling trains with respect to said fixed part, and means for permanently connecting the two last elements of said two last mentioned coupling trains with the second and third element of said first mentioned coupling train, respectively.

GASTON FLEISCHEL.